May 20, 1958 K. POSTHUMUS 2,835,805

CIRCUIT ARRANGEMENT FOR DECODING PULSE CODE MODULATION ACCORDING TO A PN-CYCLE CODE

Filed Dec. 14, 1953 3 Sheets-Sheet 1

INVENTOR
KLAAS POSTHUMUS

AGENT

May 20, 1958 K. POSTHUMUS 2,835,805
CIRCUIT ARRANGEMENT FOR DECODING PULSE CODE
MODULATION ACCORDING TO A P$_N$-CYCLE CODE
Filed Dec. 14, 1953 3 Sheets-Sheet 2

INVENTOR.
KLAAS POSTHUMUS
BY
Frank R. Trifari

May 20, 1958 K. POSTHUMUS 2,835,805

CIRCUIT ARRANGEMENT FOR DECODING PULSE CODE MODULATION ACCORDING TO A P$_N$-CYCLE CODE

Filed Dec. 14, 1953 3 Sheets-Sheet 3

INVENTOR
KLAAS POSTHUMUS

BY [signature]

AGENT

1

2,835,805

CIRCUIT ARRANGEMENT FOR DECODING PULSE CODE MODULATION ACCORDING TO A $P_n$-CYCLE CODE

Klaas Posthumus, Hilversum, Netherlands, assignor, by mesne assignments, to North American Philips Company, Inc., New York, N. Y., a corporation of Delaware Application December 14, 1953, Serial No. 398,158

Claims priority, application Netherlands December 13, 1952

12 Claims. (Cl. 250—27)

Figure 2:
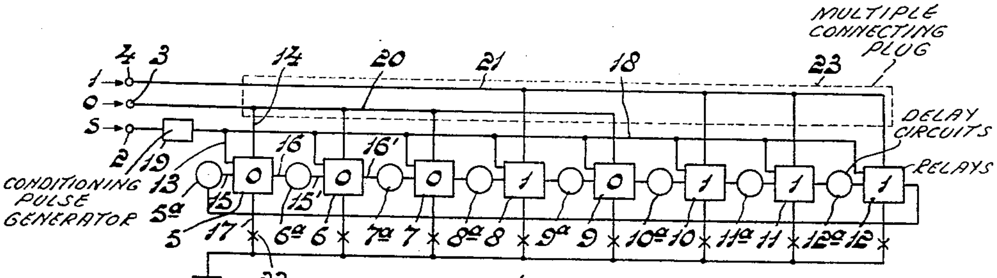

This invention relates to circuit arrangements for use with a particular type of pulse code modulation and especially for converting, with a view of decoding, this type of pulse code modulation to pluse-position or amplitude modulation. The invention may advantageously be used inter alia at the receiving end of systems for the transmission of telegraphy, telex, telephony, facsimile, television signals and the like or, for example, for the transmission of supervisory and control signals.

In pulse code modulation the pulses transmitted may be regarded as originating from a series of equal and equidistant pulses, of which particular pulses are omitted or whose polarity is inversed in accordance with the signal to be transmitted. When using a multi-unit code, groups of pulses are formed from each five succeeding pulses, definite pulses per group being suppressed or inversed in polarity in order to characterize one of 32 transmissible amplitude values.

In some types of pulse code modulation, a simple relationship exists between the composition of a code group and the amplitude-value characterized by it, thus permitting of decoding by very simple means. For example, an integrating network with a suitable time constant may be employed for a binary code.

With the code concerned, the so-called $P_n$-cycle code, there is no such simple relationship between code and amplitude, which may be of importance in view of secrecy. With such a $P_n$-cycle use is made of a series of 0-pulses and 1-pulses (represented as code units 0 and 1) totalling $2^n$ pulses ($n=3, 4, 5, \ldots$ and so on), each $n$ successive pulses forming mutually different code groups for characterising maximally $2^n$ different signal values.

For $n=3$ there are two different coding series or "keys," that is to say 00010111 and 11101000, each permitting $2^3=8$ different signal values to be represented. With the $P_3$-series 00010111, which is written in the form of a circle or closed, and the corresponding open $P_3$-series obtained by adding $(n-1)$ starting pulses, they are:

| | | | |
|---|---|---|---|
| 000 | 010 | 011 | 110 |
| 001 | 101 | 111 | 100 |

For $n=4$ there are 16 different coding series each permitting $2^4=16$ signal values to be represented. Eight of these (closed) $P_4$-coding series are:

| | |
|---|---|
| 0000110100101111 | 1111001011010000 |
| 0000100110101111 | 1111011001010000 |
| 0000101100111101 | 1111010011000010 |
| 0000110101111001 | 1111001010000110 |

the remaining eight series being obtained by reading the aforesaid eight $P_4$-series in the reversed order. In order to characterize the $p$th possible level four successive pulses of the chosen series are transmitted, which are terminated by the $p$th pulse.

2

For $n=5$ there are 2048 $P_5$ coding series, each permitting $2^5=32$ possible levels to be characterized.

When using a $P_n$ cycle code, the coding series or keys used should naturally be taken into account in decoding.

The invention provides a practicable circuit arrangement for converting, for example with a view to decoding, pulse code modulation according to a $P_n$ cycle code to, for example, pulse-position or amplitude modulation, especially if start pulses, for example synchronisation pulses, precede the code groups to be decoded.

The circuit arrangement according to the invention comprises:

(*a*) A chain of 0-relays and 1-relays controlled by conditioning pulses and 0-pulses and 1-pulses respectively, the number and sequence of said relays corresponding to the number and sequence of the 0-pulses and 1-pulses of the (closed or open) coding series, and each of said relays responding only upon the coincident appearance of a conditioning pulse and a code-pulse and subsequently resuming its initial position prior to the appearance of a next code pulse;

(*b*) A conditioning pulse generator, controlled by the start pulses, for supplying conditioning pulses, each time occurring at the instant of the first code impulse of a code group, to the 1st to $2^n$ relay of the chain;

(*c*) Delay circuits, provided between the output and input of each two successive relays, for supplying, upon response of a relay to a code impulse, an additional conditioning pulse, which appears at the instant of the next code impulse, to the next following relay of the chain.

The delay circuits each time provided between the output and input of two successive relays of the chain may advantageously be differentiating networks or artificial lines.

The relay outputs are preferably connected to the load via normally blocked switches which are unlocked under the control of gating pulses from a gate pulse generator after each incoming code group. In this manner only one pulse from a single relay is supplied to the load per incoming code group.

The circuit arrangement according to the invention may be utilised for converting incoming code groups into, say, position- or amplitude-modulated pulses. To this end, essentially only the load itself is required to be chosen in accordance with the purpose aimed at, as will be further explained hereinafter.

Figure 3:
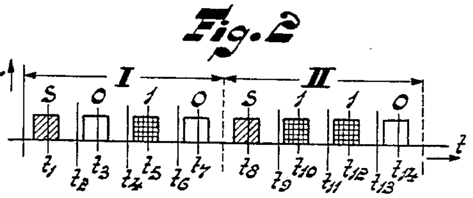
Figure 4:
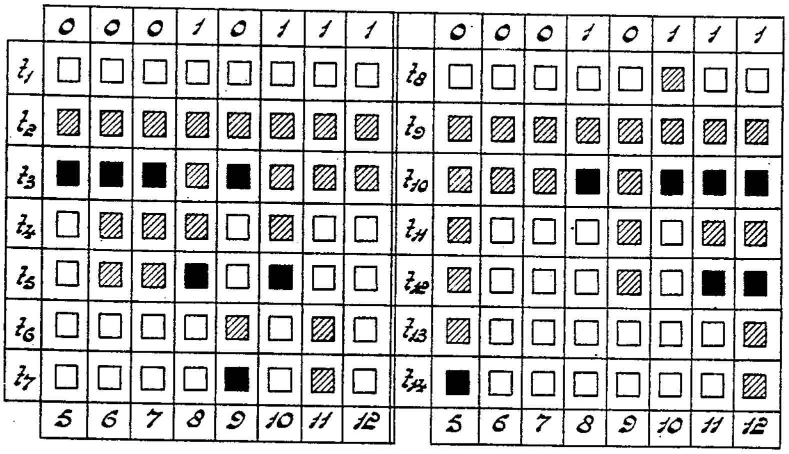
Figure 5:
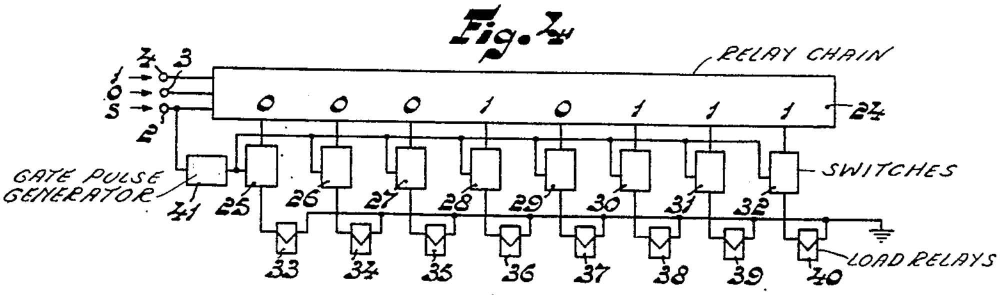
Figure 1:
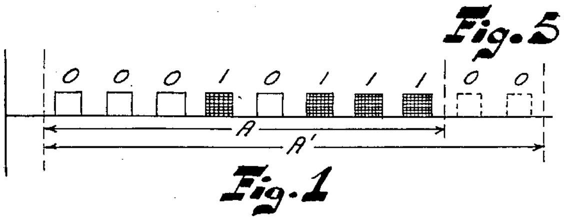
Figure 6:
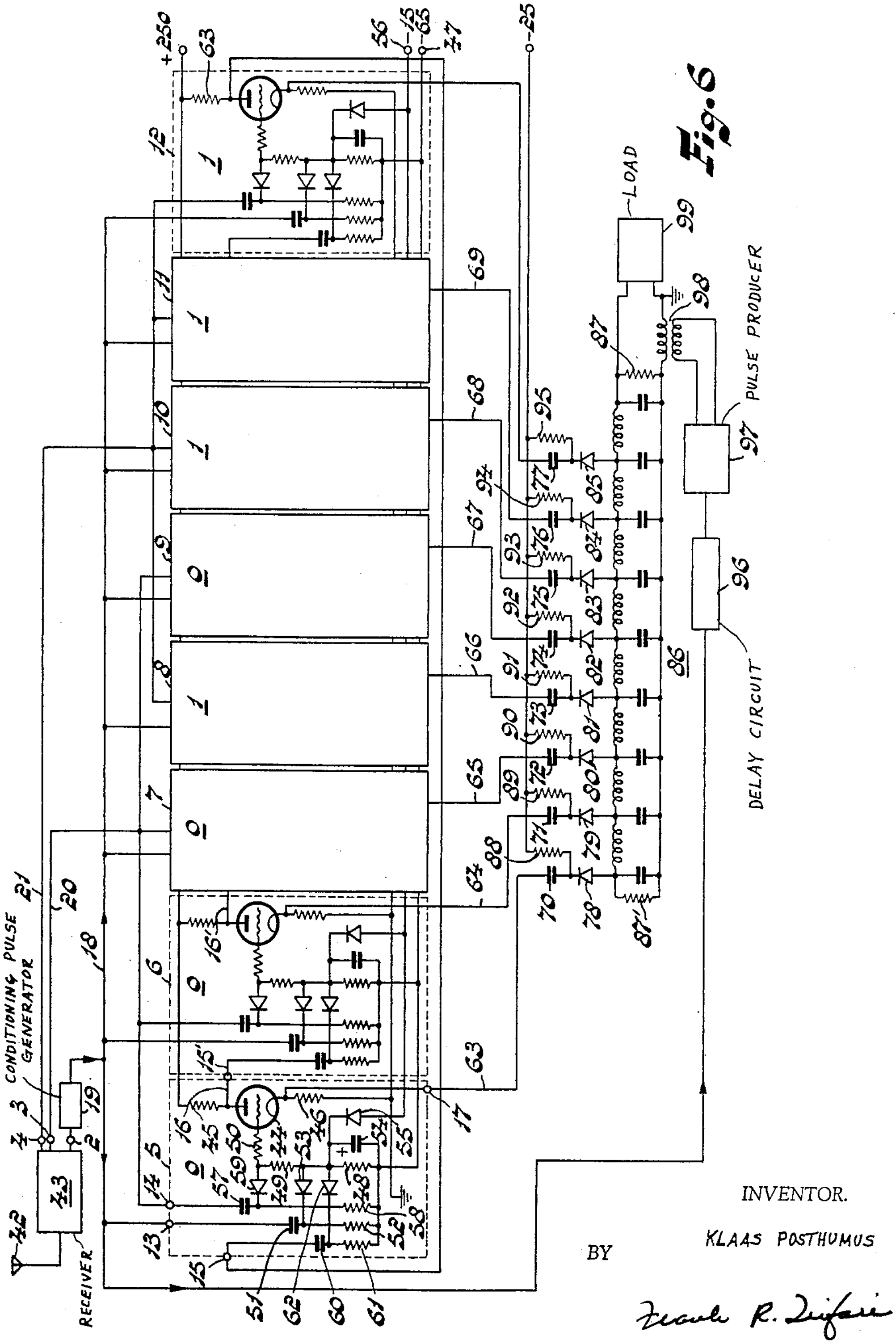
Figure 7:
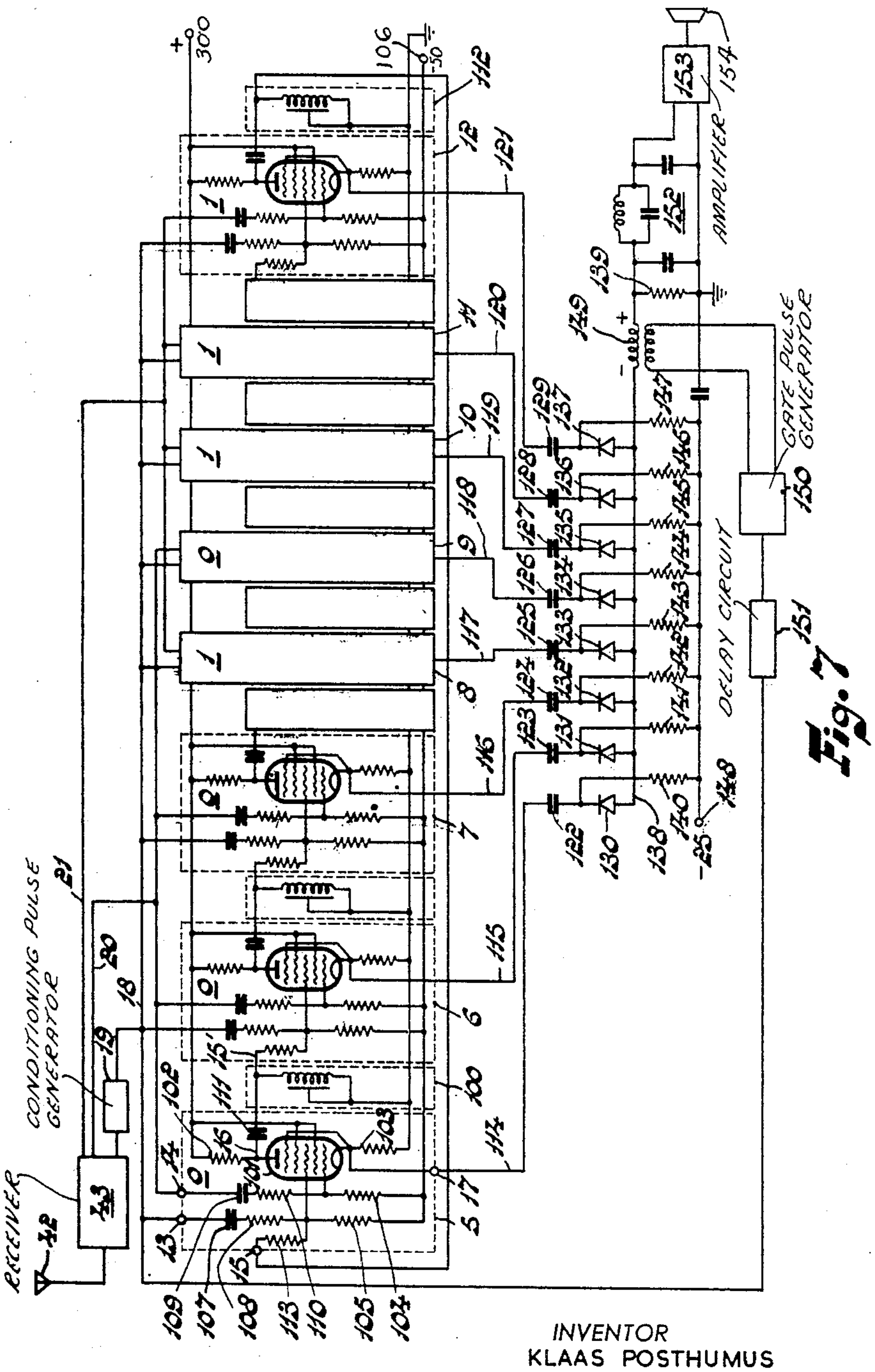

In order that the invention will be readily carried into effect it will now be described in detail with reference to the accompanying drawings, given by way of example, in which:

Fig. 1 shows a "closed" $P_3$ cycle code key and a corresponding "open" $P_3$ cycle code key, Fig. 2 is a block diagram of a simple arrangement according to the invention, Figs. 3 and 4 show a time diagram of incoming pulses and an operation diagram respectively for explaining the operation of the arrangement shown in Fig. 2, Fig. 5 shows a decoding arrangement according to the invention, for example for telex traffic, and Figs. 6 and 7 show detailed diagrams of arrangements according to the invention for obtaining position- and amplitude-modulated pulses respectively from the incoming code pulses.

With reference to Fig. 1, A represents the aforesaid "closed" $P_3$ coding series 00010111 and A' represents the corresponding "open" series 0001011100 permitting eight different signal values or eight different characters to be represented. In all of the following examples of circuit arrangements according to the invention said $P_3$ key A is employed. It will be obvious that the following explanations hold mutatis mutandis for, say, $P_4$, $P_5$ keys and so on.

The 0-pulses indicated in Fig. 1 and the cross-hatched 1-pulses may naturally be transmitted in many different ways known per se. For example, the 0- and 1-pulses may be transmitted as pulses of equal duration and amplitude but of opposite sign, either or not as modulation of a carrier-wave. Alternatively, pulses of equal polarity may be transmitted with the use of different (auxiliary) carrier waves. Moreover, the 0- and 1-pulses to be transmitted may cause distinguishable frequency- or phase-shifts of a carrier wave and so on.

If all the transmitted pulses are equidistant it is possible to suppress either the 0-pulses or the 1-pulses at the transmitter end and to add them again at the receiver end in a manner known per se for pulse code modulation transmission.

Since the method of transmission as such and the manner in which the pulses to be transmitted are produced at the transmitter end are not essential for a correct understanding of the present invention, the decoding of the incoming codegroups will only be considered hereinafter, assuming that the start pulses, the 0-pulses and the 1-pulses are separately available at the receiver end.

In the decoding arrangement shown in block-schematic form in Fig. 2, the start pulses, 0-pulses and 1-pulses are supplied to input terminals 2, 3 and 4 respectively. The decoding arrangement is designed in accordance with the closed $P_3$ series shown in Fig. 1 at A and consequently comprises eight relays 5 to 12. The relays 5, 6, 7 and 9 are 0-relays, the remaining relays 8, 10, 11 and 12 are 1-relays. The sequence of said 0- and 1-relays has been chosen in accordance with the sequence of the 0- and 1-pulses of the $P_3$ key A shown in Fig. 1.

The relay 5 has three inputs 13, 14 and 15 for conditioning pulses, code pulses (in the present case 0-pulses) and additional conditioning pulses. Moreover, there are two outputs 16, 17 for supplying an output pulse to a delay circuit 6*a* in order to obtain additional conditioning pulses required for the next relay of the chain and for supplying output pulses to a load respectively. All the relays 5 to 12 are identical and each of them comprises, as before, three inputs and two outputs, delay circuits 5*a* to 12*a* being provided between each two relays. The inputs and outputs of the relays 6 to 12 are not indicated by numbers. For an easy view the input and output corresponding to 15 and 16 of relay 5 are designated 15′ and 16′ respectively for relay 6.

The inputs 13 of all the relays, for conditioning pulses derived from start pulses are associated with the output lead 18 of a conditioning pulse generator 19 which is controlled by start pulses received via the input terminal 2 and, upon the occurrence of a start pulse, issues a conditioning pulse which is delayed relatively to the start pulse and coincides (at least partly) with the next code pulse.

The code pulse inputs of the 0-relays 5, 6, 7 and 9 are connected to 0-pulse lead 20 connected to the input terminal 3 for the 0-pulses, and the code pulse inputs of the 1-relays 8, 10, 11 and 12 are all connected to a 1-pulse lead connected to the input terminal 4 for the 1-pulses.

Each of the relays 5 to 12 is so designed as to respond when a conditioning pulse (either from the conditioning pulse generator or from the associated delay circuit) and a code pulse are supplied to it simultaneously and to resume its initial position automatically a short time thereafter and more particularly prior to the instant at which a next pulse comes in.

Upon response of a relay, for example relay 5, it supplies to the input 15′ of the next relay 6, via output 16 and delay circuit 6*a*, an additional conditioning pulse appearing at the instant of receiving a next code impulse. Each of the other relays is similarly associated with a next relay, the last relay 12 of the relay chain being associated with the first relay 5. The relays 5 to 12 thus form a closed chain corresponding to the envisaged $P_3$ series (A in Fig. 1).

The output pulse occurring upon response of a relay controls a load (22 in lead 17) located in the output lead (for example 17 of relay 5) and indicated by a cross.

The operation of the relay chain shown in Fig. 2 will be explained with reference to the operation diagram shown in Fig. 4 in the case of receiving the code groups I and II, 010 and 110 respectively, which are shown in the time diagram of Fig. 3 and are each preceded by a start pulse *s*.

At the top of the operation diagrams shown in Fig. 4 the used code key (A in Fig. 1) is repeated and the position of the associated relays is indicated at the instants $t_1$ to $t_7$ and $t_9$ to $t_{14}$ in Fig. 3. The relay numbers 5 to 12 used in Fig. 2 are repeated at the bottom of the operation diagram.

In Fig. 4, a relay in the initial position or rest position, in the absence of a conditioning pulse is indicated by an open block, a relay in the rest position in the presence of a conditioning pulse being indicated by a hatched block and a responding relay (in the operative position) being indicated by a black block.

At the instant $t_1$ of the start pulse *s*, all the relays 5 to 12 are in the rest position, a condition pulse ("priming pulse") occurring at none of the relays. The incoming start pulse of group I shown in Fig. 3 causes at all the relays, via the conditioning pulse generator 19 shown in Fig. 2 and commencing at the instant $t_2$ i. e. just before reception of the zero pulse of group I succeeding the start pulse, the appearance of a conditioning pulse corresponding in duration, for example, to the incoming pulses. This results in that at the instant $t_3$ all four present 0-relays 5, 6, 7 and 9 ($2^{(n-1)}=4$ relays) will be caused to respond by the coincident occurrence of the conditioning pulse and the incoming 0-pulse or to assume the operative position, the 1-relays 8, 10, 11 and 12 being in the rest position as before.

Each relay responding at the instant $t_3$ causes, via the succeeding delay circuit, an additional conditioning pulse at the next relay, which additional conditioning pulse occurs at least about at the instant $t_4$ of the leading edge of the second incoming code pulse. In this manner the relays 6, 7, 8 and 10 have been primed by an additional conditioning pulse at the instant $t_4$. Owing to the instantly following second code pulse, which is a 1-pulse, only the two conditioned 1-relays 8 and 10 of the chain (in the present case $2^{(n-2)}=2$ relays) are able to respond, as shown for the instant $t_5$.

Just before reception of the third code pulse (instant $t_6$) the relays 9 and 11 are primed by an additional conditioning pulse of the relays 8 and 10, with the result that at the instant $t_7$ solely the 0-relay 9 (in the present case $2^{(n-3)}=1$ relay) can be made to respond by an incoming 0-pulse. The sole finally responding relay 9 of all the relays 5 to 12 is the fifth relay of the chain (or the *p*th relay of the chain), which means that the incoming code group I (Fig. 3) comprising three code pulses terminated with the fifth pulse (or *p*th pulse) of the key used and consequently characterizes the signal value or character transmitted.

At the instant $t_8$ of the next following start pulse all the relays have resumed the rest position. Owing to the just preceding response of relay 9, the relay 10 receives an additional conditioning pulse at the instant $t_8$. This pulse, however, cannot influence the position of relay 10 in the absence of a coinciding code pulse.

Due to the start pulse *s* at the instant $t_8$ all relays receive a conditioning pulse at the instant $t_9$, similarly at the instant $t_1$. The instantly following 1-pulse causes the 1-relays 8, 10, 11 and 12 to respond ($t_{10}$) thus conditioning the relays 9, 11, 12 and 5 at $t_{11}$. The subsequently received second code pulse, again a 1-pulse, results in that the 1-relays 11 and 12 are in the operative position at the instant $t_{12}$, thus conditioning the relays 12 and 5 at the instant $t_{13}$. The last pulse of the code group II, which is a 0-pulse, causes exclusively the 0-relay 5 to respond ($t_{14}$) which means that the incoming code group consisted of the seventh, eighth and first pulse of the key used, namely the code group 110.

What has been said above holds in the same manner with the use of a $P_4, P_5 \ldots P_n$ cycle code, when $2^4, 2^5 \ldots 2^n$ relays are used in the chain.

When a different code key is to be used, for example with a $P_3$ cycle code, the key 11101000 instead of using the key denoted A in Fig. 1, only the code pulse inputs of the relays 5 to 12 need be connected with the 0- and 1-pulse leads 20 and 21 in accordance with the new key. All remaining connections in the relay chain, inclusively of the coupling thereof to the input terminal for the start pulses, may normally be maintained unchanged. The connections thus required for choosing the key may be incorporated in a multiple connecting plug 23 shown in broken lines in Fig. 2. A given decoding device may thus be adapted to a particular code key by means of a multiple connecting plug containing the envisaged key, a rapid change of key also being possible with a given apparatus. Especially with series of higher order, for example $P_5$- or $P_6$-series, this is of particular importance. Since such series permit the use of a very large number of possible keys practically only the intelligence transmitted by means of a known key is accessible to a receiving person.

Fig. 5 shows, again with respect to the code key shown in Fig. 1 at A, in block-schematic form an example in which only a single corresponding load relay, for example a customary electro-magnetic relay, responds per incoming code group. The relay chain shown in Fig. 5 entirely corresponds, except for the output pulse leads to the load, to that shown in Fig. 2, and for the sake of simplicity, is represented diagrammatically by a single block 24, in which block the relays present according to the key are designated 0 and 1. The output pulses of the various relays control, via normally open switch contacts or make contacts 25 to 32—for example normally cut off amplifying tubes used therefor—eight load relays 33 to 40. The switch contacts 25 to 32 are only closed—that is to say that the tubes are released when using tube switches—at the instant at which the last code pulse of an incoming code group appears, by means of a gate pulse generator 41 associated with all switch contacts 25 to 32, the generator 41 being controlled by start pulses supplied to the terminal 2 and supplying gate pulses which occur with a suitable time delay relatively to the start pulses.

A circuit arrangement of the type shown in Fig. 5, designed for a $P_5$ cycle code, may be utilised for telex transmission, each load relay operating a separate sign- or auxiliary-key of a receiving typewriter. The $P_5$-key used therefor may be any of the 2048 possible $P_5$ keys and should therefore be known at the receiver end.

Fig. 6 shows in detail a suitable form of a decoding circuit arrangement of the type shown in Fig. 5, but in which the load circuit is such that position-modulated pulses appear therein.

The signals picked up by an antenna 42 and consisting of a carrier-wave modulated by $P_3$-cycle code pulses are supplied to a receiver 43 in which, after amplification and detection, the incoming carrier-wave pulses are separated in start-, 0- and 1-pulses that are supplied to the input terminals 2, 3, 4 of the decoding arrangement, all of the pulses having positive polarity, a peak value of, say, 50 v. and a duration corresponding to the relative spacing. The decoding circuit-arrangement comprises, similarly to Fig. 5, 0-relays 5, 6, 7 and 9 and 1-relays 8, 10, 11 and 12 in a sequence corresponding to $P_3$-key 00010111. The conditioning pulse generator 19 controlled by the start pulses supplies, via the start pulse lead 18, to all relays 5 to 12 conditioning pulses appearing at a proper instant. The relays are identical and serve as 0- and 1-relays respectively according as to whether their code pulse inputs (14 with relay 5) are connected to the 0-pulse lead 20 or 1-pulse lead 21.

In connection with the identity of the relays 5 to 12 only three of the relays are shown in detail and hereinafter essentially the construction of the 0-relay 5 will only be described in detail.

The relay 5 comprises a triode 44 used as an electronic relay with two output resistors 45 and 46 inserted in the anode lead and cathode lead respectively. The triode 44 is normally cut off (triode-relay in rest position) by a high negative bias applied to its control grid from a grid voltage terminal 47 (−65 v.) via the series-connection of two grid resistors 48, 49 and a grid-current limiting resistor 50.

The positive conditioning pulses applied to the input 13 of relay 5 are supplied to the grid resistor 48 via a coupling network comprising a coupling capacitor 51, a cross-resistor 52 and a series diode 53 and cause a capacitor 54 connected in parallel with the grid resistor 48 to be charged positively. The maximum potential of the end of the grid resistor 48 with parallel-connected capacitor 54, which end faces the control grid, is limited by a limiting diode 55 whose cathode is connected to a grid-voltage terminal 56 to which a voltage of −15 v. is supplied. The voltage-limitation thus produced is so chosen that the maximum voltage across the parallel-connection of grid resistor 48 and capacitor 54 is unable to deblock the triode which passes anode current only at a negative grid bias of approximately −3 v. or less.

The discharge time constant of the parallel-connection of grid resistor 48 and capacitor 54 is so chosen that the voltage of −15 v. set up, on termination of a conditioning pulse, at the electrode of capacitor 54 facing the grid drops to approximately −40 v. during the time interval between the trailing edge of the start pulse and the leading edge of the first code pulse. During the occurrence of the first code pulse this voltage drops to approximately −52 v. and ultimately drops to approximately −59 v. in the time interval between the first and the second code pulse.

The incoming 0-pulses are supplied, via the input 14 and a coupling network with coupling capacitor 57, cross-resistor 58 and series-diode 59, to the end of the grid resistor 49 facing the grid of the triode, said grid resistor 49 being large in comparison with the grid resistor 48. The code pulses thus supplied are set up with substantially full amplitude (approximately 50 v.) at the grid resistor 49 and cause the supplied code pulse and the voltage set up at this instant at the capacitor 54 to become operative in superposition in the grid circuit, with the result that the triode draws anode current (triode relay in operative position) during the 0-pulse received directly after a conditioning pulse. In this event, a negative and a positive voltage pulse are respectively set up at the anode resistor 45 and the cathode resistor 46 of the triode. In the absence of further conditioning pulses in the grid circuit of the triode 44, the superposition voltage produced in the grid circuit by a next 0-pulse will be insufficient to exceed the threshold voltage of the triode. In this event, the triode cannot supply output pulses on reception of this code pulse.

The control grid circuit referred to is further connected via a coupling network with capacitor 60, cross-resistor 61 and series-diode 62, which network acts as relay circuit, to the input 15 of the relay 5 for additional conditioning pulses. The supplied additional conditioning pulses are taken from the anode resistor 63 of the relay 12 preceding relay 5 in the chain, negative output pulses being set up at said anode resistor 63 upon response of the relay 12, similarly as at the anode resistor 45 upon response of the relay 5.

In contradistinction to the coupling capacitors and cross-resistors of the coupling networks (51 to 53, 57 to 59) the capacitor 60 and cross-resistor 61 of the coupling network 60 to 62 constitute a differentiating network to the effect of producing, coincident with the trailing edge of the pulse of negative polarity supplied to the input 15, across resistor 61 a strong positive pulse (additional conditioning pulse) which, similarly to the conditioning pulses derived from the start pulses, is supplied via a series-diode, in the present case 62, to the grid end of the grid resistor 48 with parallel-connected capacitor 54 and has the same effect as the conditioning pulses supplied via the input 13. On reception of a 0-pulse directly after such an additional conditioning pulse, the triode 44 will consequently also draw anode current, in other words the relay 5 is also caused to respond in accordance with the operation described with reference to Figs. 2 to 4.

The relays 5 to 12 are individually connected via output leads 63 to 69, coupling capacitors 70 to 77 and series-diodes 78 to 85 to various tappings of an artificial line 26 made up of series-inductances and cross-capacitors and terminated at both ends in a reflection-free manner by terminating resistors 87 and 87′ respectively. The diodes 78 to 85 are normally cut off by a bias of, for example, −25 v. applied via resistors 88 to 95 to their anodes, the cathodes of the diodes being earthed via the terminating resistors 87, 87′.

Connected to the start pulse lead 18 is a delay circuit 96 and a pulse producer 97. The latter produces clearing pulses which are so delayed relatively to the start pulses as to coincide with the last code pulse of a code group received after a start pulse. These gating pulses are introduced via a transformer 98 into the earth lead of an artificial line 86 and bring about, via the cross-capacitors of the artificial line, a potential modification of the diode-cathodes whereby the diodes 78 to 85 are substantially cut off. An output pulse of any of the relays 5 to 12 of the chain, supplied to a diode-anode at the instant of a gate pulse, is able to overcome the remaining blocking of the diode and is thus supplied to the tapping of the artificial line corresponding to the relay concerned. According to the operation diagram shown in Fig. 4, the incoming last code pulse of a code group causes only one of the relays 5 to 12 to respond, hence a pulse is supplied, at the instant of the gate pulse, only to a single tapping point of the artificial line and more particularly to a tapping characteristic of the signal value transmitted. Such a pulse supplied to a tapping of the artificial line reaches the terminating resistor 87 and a load 99 connected thereto after a transmit time or delay dependent upon the number of artificial line sections situated between the tapping concerned and the artificial line end with terminating resistor 87, the summated delay of said sections being smaller than one period (or group duration) of the P cycle code used. In this manner, position-modulated pulses are supplied to the load 99, the time-spacing of these pulses relatively to the equidistant gate pulses being characteristic of the incoming code group representing a given signal value.

The relays shown in Fig. 6 comprises electronic relays in the form of triodes. It will be appreciated that other relay switches, for example grid-controlled gas-discharge tubes, transistor circuits acting as relays and so on may alternatively be substituted for said triodes.

Fig. 7 shows a further form of a circuit-arrangement according to the invention, which essentially corresponds to the form shown in Fig. 6 but in which the relays themselves as well as the delay circuits between the relays and the load circuit associated with the relays are of different construction. The relay and the delay circuits between them are again equal and hence it will be sufficient to describe in detail the construction of relay 5 and the succeeding delay circuit 100.

The relay 5 comprises a hexode 101 with output resistors 102, 103 in the anode lead and cathode lead respectively. The first and the second control grid of the hexode 101 are connected, via grid resistors 104 and 105 respectively to a negative grid potential terminal 106 to which a voltage of −50 v. is applied. Owing to this negative bias the hexode 101 is normally entirely cut off and unblocked only when a sufficiently strong positive pulse is simultaneously supplied to both control grids.

Via the input 13 of relay 5 conditioning pulses are supplied from the priming pulse generator 19 by way of a coupling capacitor 107 and a resistor 108, intended for decoupling and grid-current limitation, to the second control grid of the hexode. Code pulses, in the present case 0-pulses from the 0-pulse lead 20 are supplied to the first control grid of the hexode via the input 14, coupling capacitor 109 and grid-current limiting resistor 110. When a conditioning pulse supplied via the input 13 and a code pulse supplied via the input 14 appear simultaneously, the hexode 101 is fully unblocked and a negative and positive output pulse appear at the anode resistor 102 and the cathode resistor 103 respectively.

The negative output pulse appearing at the anode resistor 102 is supplied via a coupling capacitor 111 to the delay circuit 100 consisting of an artificial line which is short-circuited at one end and whose transit time corresponds to half the time-spacing of the leading edges of successive incoming pulses. A negative pulse supplied thereto is reflected at the short-circuited end and produces at the input a positive pulse delayed with double the transit time. This positive pulse is supplied as an additional conditioning pulse via the lead 15′ to the next relay 6 of the chain.

Similarly, an additional conditioning pulse of positive polarity is taken from the last relay 12 of the chain by means of a delay circuit 112 comprising a short-circuited delay line, said additional conditioning pulse, similarly to the conditioning pulses from the priming pulse generator 19, being supplied to the second control grid of the hexode 101 via the input 15 of relay 5 and the grid-current limiting resistor 113. Consequently, the additional conditioning pulses prime the relay 5 to respond in the same manner as conditioning pulses coming in via the input 13 and derived from the start pulses, in accordance with the operation diagram shown in Fig. 4.

When the relay 4 responds, that is to say as soon as the hexode 101 draws the full anode current, a positive output pulse appears at the output 17 connected to the cathode of the hexode 101, the amplitude of this output pulse depending upon the value of the cathode resistor 103. The cathode resistors of the relays 5 to 12 are different (alternatively the outputs, in the case of the cathode resistors being equal, are connected to mutually different tappings) such that each relay, upon response, supplies a pulse with an amplitude proportional to the signal value represented by the code group characterized by the relay concerned. In this manner output pulses with different amplitudes appear in the output leads 114 to 121 of the relays 5 to 12, in other words the incoming code groups have been converted into corresponding amplitude values as a result of the construction chosen for the relays. The output pulses thus obtained are supplied via coupling capacitors 122 to 129 to normally locked series-diodes 130 to 137 whose cathodes are associated with a common lead 138 and an earthed output resistor 139. The diodes 130 to 137 are normally cut off by a negative bias (−25 v.) from the terminal 148, which bias is applied via resistors 140 to 147 to the anodes of said diodes.

At the instant of receiving the last code pulse of a code group the diodes 130 to 137 are substantially or entirely unblocked by means of a gate pulse of negative polarity supplied to the cathodes, which gate pulses are taken from a gate pulse generator 150 via a transformer 149. Similarly as described with respect to the pulse producer 97 shown in Fig. 6, the gate pulse producer 150 is connected via a delay circuit 151 to the conditioning pulse lead 18.

The amplitude-modulated pulses appearing across the output resistor 139 are supplied to a loudspeaker 154 via a low-pass filter 152 and amplifier 153 suppressing inter alia the pulse recurrence frequency. Hence, the decoding circuit-arrangement described, permits of converting the incoming P-cycle code groups into the signals, for example voice signals, characterized thereby.

In the examples described, a closed chain of relays is invariably used. Alternatively, however, an open relay chain may be employed, in which event the number and succession of relays must correspond to the corresponding open $P_n$ key. When using a $P_3$-cycle code a relay chain should then be used which is in agreement with the open $P_3$ key shown in Fig. 1 at A'. In this event, in contradistinction to the examples described, the last relay of the chain is not coupled via a relay circuit to the first relay of the chain and, moreover, the added (or $(n-1)$) relays, as compared with the closed chain, need not be coupled to the priming pulse generator 19.

What is claimed is:

1. A circuit arrangement for decoding pulse-code-modulation according to a $P_n$-cycle code in which each $n$ successive code pulses of a coding series including 0-pulses and 1-pulses mutually form different code groups representing different signal values and wherein the code groups are proceded by starting pulses, said circuit arrangement comprising a chain of 0-relays and 1-relays, said relays having a number and sequence corresponding to the number and sequence of said 0- and 1-pulses of said coding series, a conditioning pulse generator having an output coupled to the input of the first to $2^n$ relay of said chain and applying thereto conditioning pulses during the instant of the first code pulse of a code group, means for applying said starting pulses to the input of said generator, means to apply said 0-pulses and said 1-pulses to the corresponding relays of said chain, delay circuits interposed between the output and input respectively of each two successive relays and applying upon response of a preceding relay to a code pulse an additional conditioning pulse to the next following relay of said chain at the instant of the next code pulse, each of said relays including means for rendering each said relay responsive only upon the coincident occurrence of a conditioning pulse and a code pulse and resuming its initial position prior to the appearance of the next succeeding code pulse, and a load coupled to the outputs of said relays.

2. A circuit arrangement as set forth in claim 1, wherein each of said relays comprises a normally blocked grid-control device which is connected to draw load current only upon the coincident appearance of a conditioning pulse and a code pulse.

3. A circuit arrangement as set forth in claim 1, wherein said load comprises $2^n$ electromagnetic relays, each of said electromagnetic relays being coupled to the output of one of the relays of said chain.

4. A circuit arrangement as set forth in claim 1, further including switching means interposed between the outputs of said relays and said load, means for blocking said switches, and a gate pulse generator coupled to said switching means to unblock same upon the termination of each of the code groups.

5. A circuit arrangement as set forth in claim 4, further including means for applying said starting pulses to said gate pulse generator.

6. A circuit arrangement as set forth in claim 4, further including means for coupling the output of said conditioning pulse generator to the input of said gate pulse generator.

7. A circuit arrangement for decoding pulse-code-modulation according to a $P_n$-cycle code in which each $n$ successive pulses of a coding series including 0-pulses and 1-pulses mutually form different code groups representing different signal values and wherein the code groups are preceded by starting pulses, said circuit arrangement comprising a chain of 0-relays and 1-relays, said relays having a number and sequence corresponding to the number and sequence of said 0- and 1-pulses of said coding series, each of said relays comprising an electron discharge device having an anode and a control grid, a conditioning pulse generator producing conditioning pulses, means for applying said starting pulses to said conditioning pulse generator, delay networks interposed between the output and input respectively of each two successive relays and applying upon response of the first of said two successive relays to a code pulse an additional conditioning pulse to the control grid of the device of the second of said two successive relays at the instant of the next code pulse, a plurality of coupling networks, means for applying the conditioning pulses from said conditioning pulse generator to the control grid of each of said devices through a different one of said coupling networks during the instant of the first code pulse of a code group, means for applying said 0- and 1-pulses to the control grid of the device of the corresponding relays of said chain through a different one of said coupling networks, each of said devices having values of operating voltages at which anode current flows therein only upon the coincident occurrence of a conditioning pulse and a code pulse at the control grid of the respective device and resuming its initial position prior to the appearance of the next succeeding code pulse, and a load coupled to the outputs of said relays.

8. A circuit arrangement as set forth in claim 7, wherein each of said delay networks includes a differentiating circuit having a capacitor and a resistor connected in parallel with said capacitor and a series-diode connected to the output of said differentiating circuit.

9. A circuit arrangement as set forth in claim 7, further including an artificial line closed reflection-free at both ends thereof and having equidistant tappings respectively coupled to the outputs of the relays of said chain, said load being coupled to one end of said line to receive position-modulated pulses.

10. A circuit arrangement for decoding pulse-code-modulation according to a $P_n$-cycle code in which each $n$ successive pulses of a coding series including 0-pulses and 1-pulses mutually form different code groups representing different signal values and wherein the code groups are preceded by starting pulses, said circuit arrangement comprising a chain of 0-relays and 1-relays, said relays having a number and sequence of said 0- and 1-pulses of said coding series, each of said relays comprising an electron discharge device having two control grids and an anode, a conditioning pulse generator producing conditioning pulses, means for applying said starting pulses to said conditioning pulse generator, delay circuits interposed between the output and input respectively of each two successive relays and applying upon response of the first of said two successive relays to a code pulse an additional conditioning pulse to one of the two grids of the device of the second of said two successive relays at the instant of the next code pulse, means for applying the conditioning pulses from said conditioning pulse generator to one of said two control grids of each of said devices during the instant of the first code pulse of a code group, means for applying said 0- and 1-pulses to one of said two control grids of the device of the corresponding relays of said chain, each of said devices having values of operating voltages at which anode current flows therein only upon the coincident appearance of a conditioning pulse and a code pulse at the control grids of the respective device and resuming its initial position prior to the appearance of the next succeeding code pulse, and a load coupled to the outputs of said relays.

11. A circuit arrangement as set forth in claim 10, wherein each of said delay circuits includes an artificial line short-circuited at one end.

12. A circuit arrangement as set forth in claim 10, wherein the relays of said chain produce output pulses of mutually different amplitudes and wherein said load is coupled to said relays for receiving amplitude-modulated pulses.

References Cited in the file of this patent

UNITED STATES PATENTS 2,592,308 Meacham -------------- Apr. 8, 1952